June 19, 1945.  B. G. REINKE  2,378,657
SWEEP SICKLE
Filed May 24, 1944
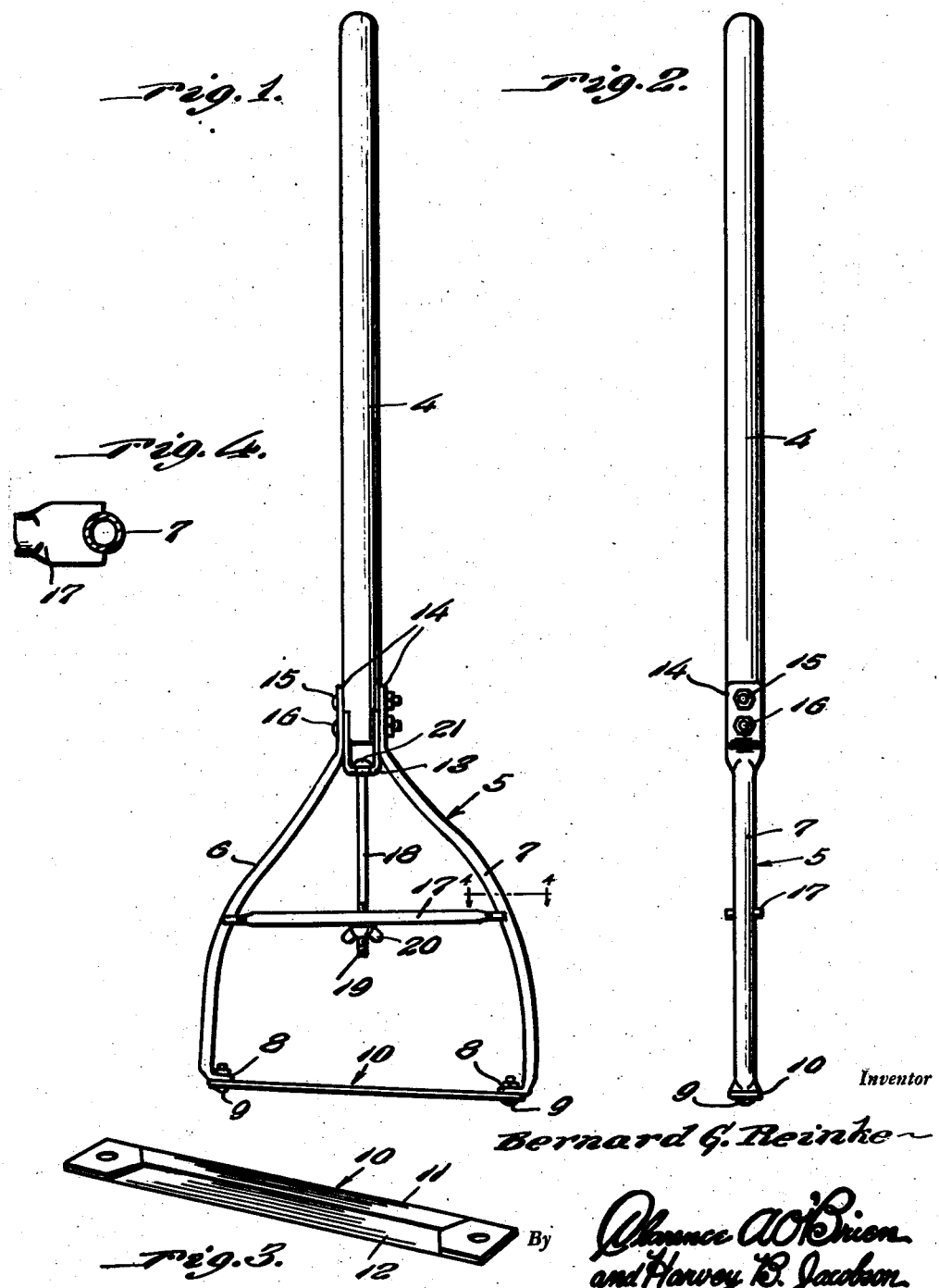

Patented June 19, 1945

2,378,657

UNITED STATES PATENT OFFICE 2,378,657

SWEEP SICKLE

Bernard G. Reinke, Flint, Mich.

Application May 24, 1944, Serial No. 537,099

2 Claims. (Cl. 30—279)

This invention relates to a sweep sickle of a long handle walking attendant type having a double-edged cutting blade which is swept back and forth in broom-like fashion to cut high grass, weeds, hedge, bushes and the like; and, the purpose of the invention is to provide a structure possessed of appreciable distinctions and refinements aptly suited for incorporation in an implement of the classification stated.

Designed to permit serviceable use as the walking attendant stands erect, the device performs desired cutting results with expediency and reliability and avoids the necessity of the user bending or stooping.

In carrying out the principles of the invention I have evolved and produced a properly angled handle and cutting blade, the latter mounted in an improved yoke, the latter being characterized by strength and durability sufficient to withstand comparatively rough handling and usage, the contributing factors of balance and stress and strain distribution rendering the overall structure such as to promote rapidity of action, and, a minimum of physical exertion and effort.

In addition to being economical and otherwise feasible and practicable the structure adopted will cut either wet or dry grass and weeds having stems up to one-half inch in diameter, this with ease and skill.

Other minor objects, features and advantages will become more readily apparent from the following description and the accompanying illustrative drawing.

In the drawing, wherein like numerals are employed to designate like parts throughout the views:

Figure 1 is an elevational view of a sweep-type sickle constructed in accordance with the specific structural principles of the present invention.

Figure 2 is an edge elevational view, that is, a view at right angles to Figure 1.

Figure 3 is a perspective detail of the double-edged cutting blade.

Figure 4 is a section on the line 4—4 of Figure 1.

The handle 4 is of appropriate material and dimensions to facilitate its handling and use by the walking attendant. The yoke 5 is of sectional form, the same embodying complemental metal tubes 6 and 7, the tube 7 being slightly longer than the tube 6 and the free ends of said tubes being directed laterally and inwardly toward each other as at 8, where they are bolted or otherwise secured as at 9 to the end of the cutting blade 10. As shown in Figure 3, this blade has oppositely tapered or so-called "double cutting" edges 11 and 12 which function alternately as the device is used "broom-like" and pendulously swung back and forth. A U-shaped clevis 13 has its arms fitting in diametrically opposite keeper notches in the adjacent end of the handle. This is brought out in Figure 1. The bight portion is spaced from said handle-end. The attachable inner parallel or straight ends 14 are primarily bolted as at 15 to the handle and extend beyond the adjacent ends of the limbs or arms of the clevis. These clevis limbs are clamped between the flattened ends 14 and a second bolt 16 passes through all five parts, that is, the flat attaching ends 14, the clevis limbs and the intervening handle or stick. This is an expedient yet simple and economical assemblage promoting the aforementioned factors of stress distribution and equalization of strain. A device in this category must be light in weight and yet sturdy and it is believed that this construction fulfills the requirements of such aims.

I next direct attention to the cross-brace 17 arranged between the yoke or frame members 6 and 7 and having its ends engaged with the curvate intermediate portions of said yoke members 6 and 7. A stay and adjusting bolt 18 is provided, the lower threaded end 19 passing through an aperture in said brace and being provided with a wing nut for adjustment and tightening purposes, the nut indicated at 20. The upper end 21 is preferably headed and passes through an aperture in the bight portion of the clevis 13. This provides a convenient mode of detachably connecting the inner or upper end of said bolt through the clevis and to facilitate repair if necessary.

I desire to emphasize the construction seen in Figure 1 in which the clevis is interposed between the bolted ends 14 of the frame or yoke members 6 and 7, as well as the use of the second bolt 16 which passes through the five parts heretofore mentioned. This is indeed a reliable and sturdy arrangement and yet promotes replacement and repair, as is obvious. Then too, the brace 17, the stay bolt 18 and coaction between said bolt 18 and the bight portion of the clevis is worthy of consideration as a novel structural refinement of parts.

It is thought that persons skilled in the art to which the invention relates will be able to obtain a clear understanding of the invention after considering the description in connection with the drawing. Therefore, a more lengthy description is regarded as unnecessary.

Minor changes in the shape, size and arrangement of details coming within the field of invention claimed may be resorted to in actual practice, if desired.

Having described the invention, what is claimed as new is:

1. A sweep-type sickle of the class described comprising an elongated handle, a U-shaped clevis at the lower end of said handle having its limbs extending upwardly and engaging diametrically opposite sides of the handle, said sides being notched for reception of said limbs and the bight portion being spaced from the adjacent end of the handle, a yoke embodying longitudinally bowed sections, the inner ends of said sections being straight and parallel and extending along the limbs of the clevis with their extremities projecting upwardly beyond ends of the limbs and bolted to diametrically opposite sides of the handle at points inwardly of the adjacent ends of the limbs of the clevis, a second bolt passing through said parallel ends of the arms and through the limbs of the clevis as well as the handle, outer ends of the said section being formed with inwardly extending ears, a cutting blade between the outer ends of the yoke sections having its ends overlapped by said ears, bolts passing through the ears and ends of the blade, a cross-brace interposed between the intermediate portions of said sections with its ends straddling the said sections and shiftable along the same, and a stay bolt connection carried by the bight portion of the clevis and having its threaded lower end portion passing through the opening end the intermediate portion of said cross-brace and carrying a nut for engaging the cross-brace and forcing the same upwardly to the said sections and exerts transverse pull upon the bolts of the blade and prevents loosening thereof.

2. A sweep sickle of the class described comprising a handle, a yoke-like frame mounted on the outer end thereof and including downwardly diverging arms, and a cutting blade extending between lower ends of the arms, bolts connecting ends of the cutting blade to ends of the arms, a cross-brace arranged in said yoke and having its ends engaging the arms and slidable along the arms, a clevis on said handle, a bolt having its lower end portion threaded and passing through an opening formed in the intermediate portion of the cross-brace and adjustably and detachably connected at its opposite end to the bight portion of said clevis, and a nut upon the threaded lower end of said bolt engaging the under face of said cross-brace for forcing the brace upwardly and spreading the arms for applying stress to the bolts securing ends of the blade to lower ends of the arms.

BERNARD G. REINKE.